US009152347B2

(12) United States Patent
Kumar et al.

(10) Patent No.: US 9,152,347 B2
(45) Date of Patent: *Oct. 6, 2015

(54) STORAGE AND RETRIEVAL OF HIGH IMPORTANCE PAGES IN AN ACTIVE MEMORY SHARING ENVIRONMENT

(71) Applicant: International Business Machines Corporation, Armonk, NY (US)

(72) Inventors: Keerthi B. Kumar, Bangalore (IN); Shailaja Mallya, Mangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,633

(22) Filed: Jan. 28, 2014

(65) Prior Publication Data

US 2015/0113232 A1    Apr. 23, 2015

Related U.S. Application Data

(63) Continuation of application No. 14/056,061, filed on Oct. 17, 2013.

(51) Int. Cl.
*G06F 3/06* (2006.01)

(52) U.S. Cl.
CPC ............ *G06F 3/0655* (2013.01); *G06F 3/0604* (2013.01); *G06F 3/0673* (2013.01); *G06F 2003/0697* (2013.01)

(58) Field of Classification Search
CPC ................................. G06F 12/00; G06F 12/02
USPC ....................... 710/36, 62; 711/167, 170–173
See application file for complete search history.

(56) References Cited

U.S. PATENT DOCUMENTS

| | | | |
|---|---|---|---|
| 6,324,546 B1 * | 11/2001 | Ka et al. ...................... | 717/170 |
| 7,225,211 B1 * | 5/2007 | Colgrove et al. ............. | 707/693 |
| 7,584,465 B1 * | 9/2009 | Koh et al. ..................... | 717/162 |
| 8,127,095 B1 * | 2/2012 | Colgrove et al. ............. | 711/162 |
| 8,230,395 B1 * | 7/2012 | Koh et al. ..................... | 717/121 |
| 8,285,961 B2 * | 10/2012 | Sikdar et al. .................. | 711/170 |
| 8,327,083 B2 | 12/2012 | Jacobs et al. | |
| 8,359,449 B2 | 1/2013 | Accapadi et al. | |
| 2003/0188263 A1 * | 10/2003 | Bates et al. .................... | 715/513 |
| 2009/0307445 A1 | 12/2009 | Jacobs et al. | |
| 2011/0060859 A1 * | 3/2011 | Shukla et al. ................. | 710/314 |
| 2011/0154133 A1 | 6/2011 | Ganti et al. | |
| 2011/0320436 A1 * | 12/2011 | Hokanson ..................... | 707/719 |

(Continued)

OTHER PUBLICATIONS

Brito et al., "IBM PowerVM Virtualization Active Memory Sharing", International Technical Support Organization, Second Edition (Jun. 2011), Copyright International Business Machines Corporation 2011, ibm.com/redbooks, pp. 1-122, <http://www.redbooks.ibm.com/redpapers/pdfs/redp4470.pdf>.

(Continued)

*Primary Examiner* — Christopher Shin
(74) *Attorney, Agent, or Firm* — David B. Woycechowsky

(57) ABSTRACT

Using a set of non-volatile storage media and a virtual input/output system operating in a memory sharing environment, by: (i) estimating which non-volatile storage medium, of the set of non-volatile storage media, will have the fastest access at a given time; and (ii) read-writing (that is, reading and/or writing) data by the virtual input/output system of a high importance page to the non-volatile storage media estimated to have the fastest access time.

5 Claims, 4 Drawing Sheets

(56) References Cited

U.S. PATENT DOCUMENTS

2012/0173831 A1* 7/2012 Rubio et al. .................. 711/165
2013/0132637 A1 5/2013 Kumar et al.
2014/0122772 A1* 5/2014 Kumar et al. ..................... 711/6

OTHER PUBLICATIONS

U.S. Appl. No. 14/056,061, entitled "Storage and Retrieval of High Importance Pages in an Active Memory Sharing Environment", filed Oct. 17, 2013.

* cited by examiner

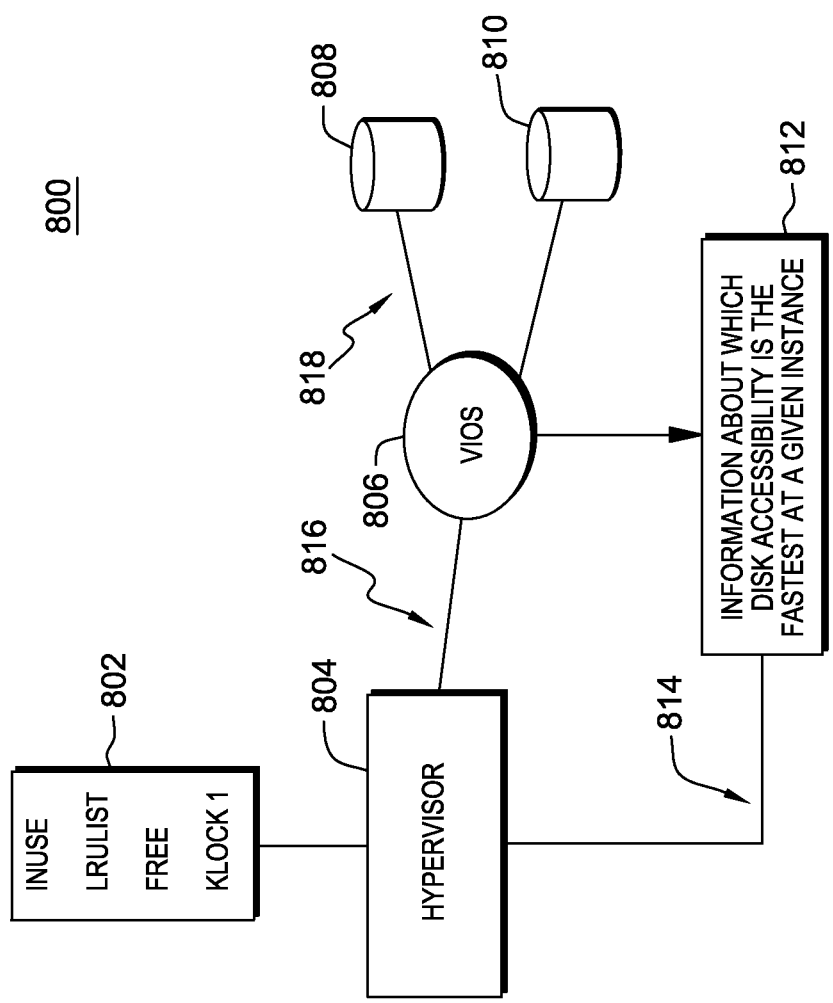

STORAGE AND RETRIEVAL OF HIGH IMPORTANCE PAGES IN AN ACTIVE MEMORY SHARING ENVIRONMENT

CROSS REFERENCE TO RELATED APPLICATIONS

This application claims priority to co-pending U.S. patent application Ser. No. 14/056,061, filed Oct. 17, 2013.

FIELD OF THE INVENTION

The present invention relates generally to the field of retrieving, by a processor, a high priority page.

BACKGROUND OF THE INVENTION

A kernel is a computer program that manages input/output requests from software and translates them into data processing instructions for the central processing unit. When a computer program (called a process) makes a request of the kernel, that request is called a system call.

Virtual memory is a memory management technique that is implemented using both hardware and software. It maps memory addresses used by a program, called virtual addresses, into physical addresses in computer memory. Because of the virtual addresses, main storage, as communicated by a process or task, appears as a contiguous address space or collection of contiguous segments. A virtual memory manager manages virtual address spaces and the assignment of real memory to virtual memory. Address translation hardware in the CPU (central processing unit), often referred to as a memory management unit or MMU, automatically translates virtual addresses to physical addresses. The primary benefits of virtual memory include: (i) freeing applications from having to manage a shared memory space, (ii) increased security due to memory isolation, and (iii) ability to conceptually use more memory than might be physically available, using the technique of paging.

At a very high level, klock pages are the kernel pages that are "stolen" by the Virtual Memory Manager (VMM) in certain UNIX type operating systems, only after other user space pages and other non-klocked pages are stolen by it. K-lock stands for kernel-locked. The operation of retrieving a high priority page (called a "klock page"), by a computer processor, will have a certain amount of performance overhead associated with it.

A memory sharing environment (such as Active Memory Sharing ("AMS")) is any environment where non-volatile storage medium (for example, disk storage) is at least partially substituted for storage that would normally take place in a volatile memory. For example, in a memory sharing environment, klock pages may be stored on, and retrieved from, a non-volatile storage medium.

SUMMARY

A method, system and/or computer program product for use with a set of non-volatile storage media and a virtual input/output system operating in a memory sharing environment. This includes the following steps (not necessarily in the following order): (i) estimating which non-volatile storage medium, of the set of non-volatile storage media, will have the fastest access at a given time; and (ii) read-writing data by the virtual input/output system of a high importance page to the non-volatile storage media estimated to have the fastest access time.

BRIEF DESCRIPTION OF THE SEVERAL VIEWS OF THE DRAWINGS

FIG. 4 is a schematic view of a fourth embodiment of a computer memory system suitable for use with embodiments of the present disclosure.

DETAILED DESCRIPTION

Figure 1:
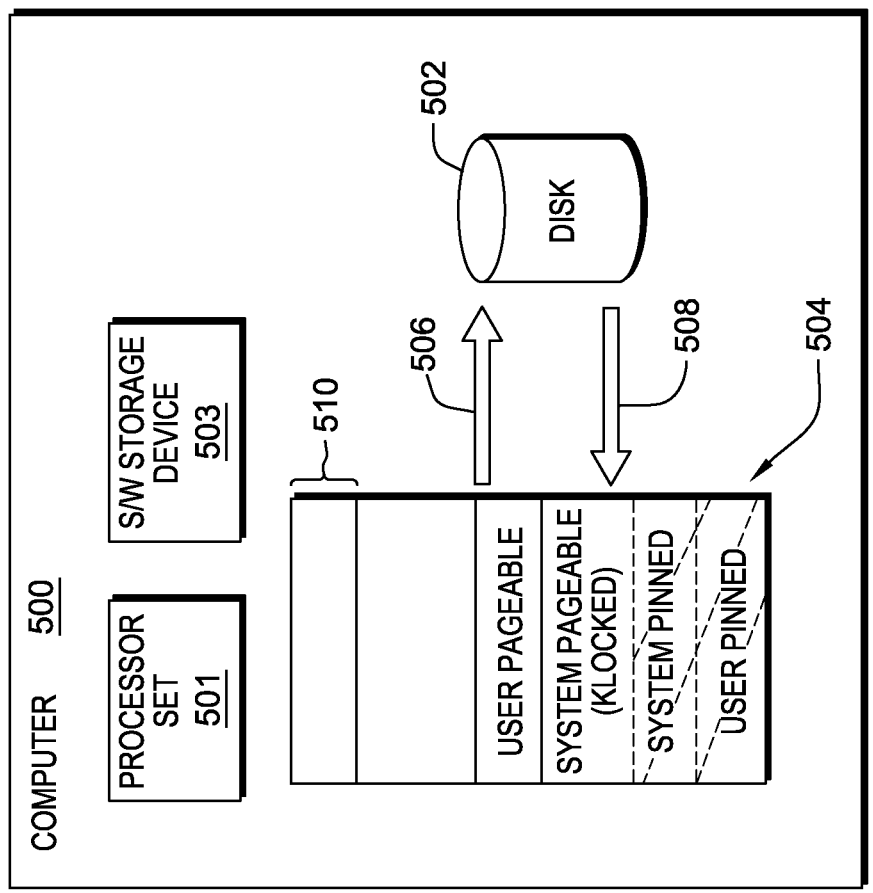
FIG. 1 is a schematic view of a first embodiment of a computer suitable for use with embodiments of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the block diagram block or blocks.

Some embodiments of the present disclosure recognize the following: (i) retrieving the klock page from a data storage space provided by the VIOS (Virtual I/O Server) in an Active Memory Sharing (AMS) environment tends to be relatively slow; (ii) at a high level, an Active Memory Sharing environment (AMS environment) is a combination of paging space from the VIOS (Virtual I/O Server) in addition to the shared memory pool from the real memory of the server; (iii) one reason for the relative slowness is that there is no guarantee that klock pages will always reside in the shared memory pool; (iv) however, these klock pages can always be paged out to the VIOS Paging Space Partition. Some embodiments of the present disclosure achieve faster page steals for the high priority pages (called klock pages).

Some embodiments of the present disclosure may include one, or more, of the following features, characteristics and/or advantages: (i) enable the hypervisor to get information of which disk is accessible the fastest at a given instance of time; (ii) based upon the identity of the currently-fastest disk (which will be passed on to the OS, in this case the VIOS, Virtual I/O Server), the klock pages used for Active Memory Sharing (AMS) are stored on the currently-fastest disk; (iii) retrieving klock pages faster through "selective mirroring;" (iv) faster accessibility of klock pages at a given instance of time in the shared memory environment; (v) intelligence built into the hypervisor such that the hypervisor is able to differentiate between the kind of storage medium on which the pages used for Active Memory Sharing (AMS) will be stored; (vi) using the concepts of selectively storing high priority pages on the currently-fastest storage medium (for example, currently fastest disk) and load balancing, providing an effective mechanism to make the retrieval of high priority pages faster. There might be high priority pages that are not klock pages, and that might belong to some user application. Usually, pages belonging to kernel extension and kernel device drivers are, by default, made klock pages, because the retrieval/access of such pages is high priority, any delay in retrieval/access can potentially lead to a system crash.

Certain UNIX type operating system Kernel Memory Locking and AMS (Active Memory sharing) features, and related abbreviations, will now be discussed in the following paragraphs. Full form of the memory-related abbreviations follow:
UTOS: UNIX type operating system
AMS: Active Memory Sharing
AMD: Advanced Memory Deduplication
LRU: Least Recently Used
PFT: Page Frame Table
Full form of the hardware-related and software-related abbreviations follow:
I/O: Input/Output
S/W: Software also (s/w)
H/W: Hardware also (h/w)
VIOS: Virtual I/O Server
LPAR: Logical PARtition
Full form of the disk-related abbreviations follow:
SCSI: Small Computer System Interface
SAS: Serial Attached SCSI
SAN: Storage Area Network
vSCSI: Virtual SCSI
SATA: Serial Advanced Technology Attachment A short description of an example of Kernel Memory locking will now be set forth. The UTOS kernel is pageable. This means that there are kernel data structures that are not pinned in memory and can be paged out to the paging space just like the user-space data. This allows the UTOS kernel to work well on small memory systems. However, side effects of making kernels pageable have become a performance inhibitor for customers whose systems run with sufficient memory such that there is little or no paging.

One of the side effects of the above mechanism is an inflated use of paging space due to paging of kernel data. Often, paging space used for the kernel data is never freed up. Also, the latency to resolve the kernel page-faults is a problem for certain real-time processes, such as the Heartbeat daemon. It would be desirable to avoid such side effects on a system with enough memory to cause little or no paging. This leads to a need for Kernel memory locking. To solve this issue, the first step taken was implicitly locking kernel data in memory until such time when no other option is left but to page the kernel data out. Implicit locking of the kernel data is termed "kernel locking." Some embodiments of this disclosure provide situations where having kernel locking at the UTOS level is not sufficient and the need to extend Kernel memory locking to the AMS (Active Memory Sharing) implementation is highlighted.

FIG. 1 shows computer 500 including: processor set 501; disk 502; software storage device 503; memory block 504 (including minimum free portion 510); LRU daemon communication path 506; and memory access communication path 508. The software storage device stores software for performing steps of a method according to the present disclosure, and processor set 501 causes the steps to be performed by running the software. FIG. 1 further shows the working of kernel memory pinning. Here real memory is dedicated to a single LPAR. Among the many types of pages in the memory are the pinned pages. The pinned pages will always be kept in the real memory and LRU daemon cannot steal them until they are unpinned. Another type of pages, which are the main topic of this paper, are the klock pages (kernel locked pages are the pages of some kernel extensions, or kernel pages/kernel data/kernel stack). LRU daemon can steal these klock pages, but lrud (that is, the LRU daemon) will steal these klock pages when nothing else can be stolen. The LRU daemon will first steal the pageable user pages, then comes to the klocked pages. The real advantage of locked memory is that it is not stolen until no other option is left. In this sense, chance of retaining kernel data in memory longer is increased.

A short description of Active Memory Sharing (AMS) will now be set forth. One benefit provided by AMS support is the ability to oversubscribe memory on a system at the LPAR level. Conventionally, memory is often the limiting factor for determining the number of LPARs that can be created on a system. Since an LPAR has always had dedicated physical memory, the number of LPARs that can be created is limited by the amount of physical memory in a machine. With AMS support, a user can create more LPARs on the system by over-committing physical memory. The cumulative logical memory size across all AMS partitions can be greater than the size of physical memory. In the case where the cumulative logical memory size across all of such partitions is greater than the size of physical memory, the hypervisor pages out partitions' logical memory to the VIOS Paging space partition. AMS support is modeled somewhat after shared processor support. Each AMS partition will have its own paging space.

Figure 2:
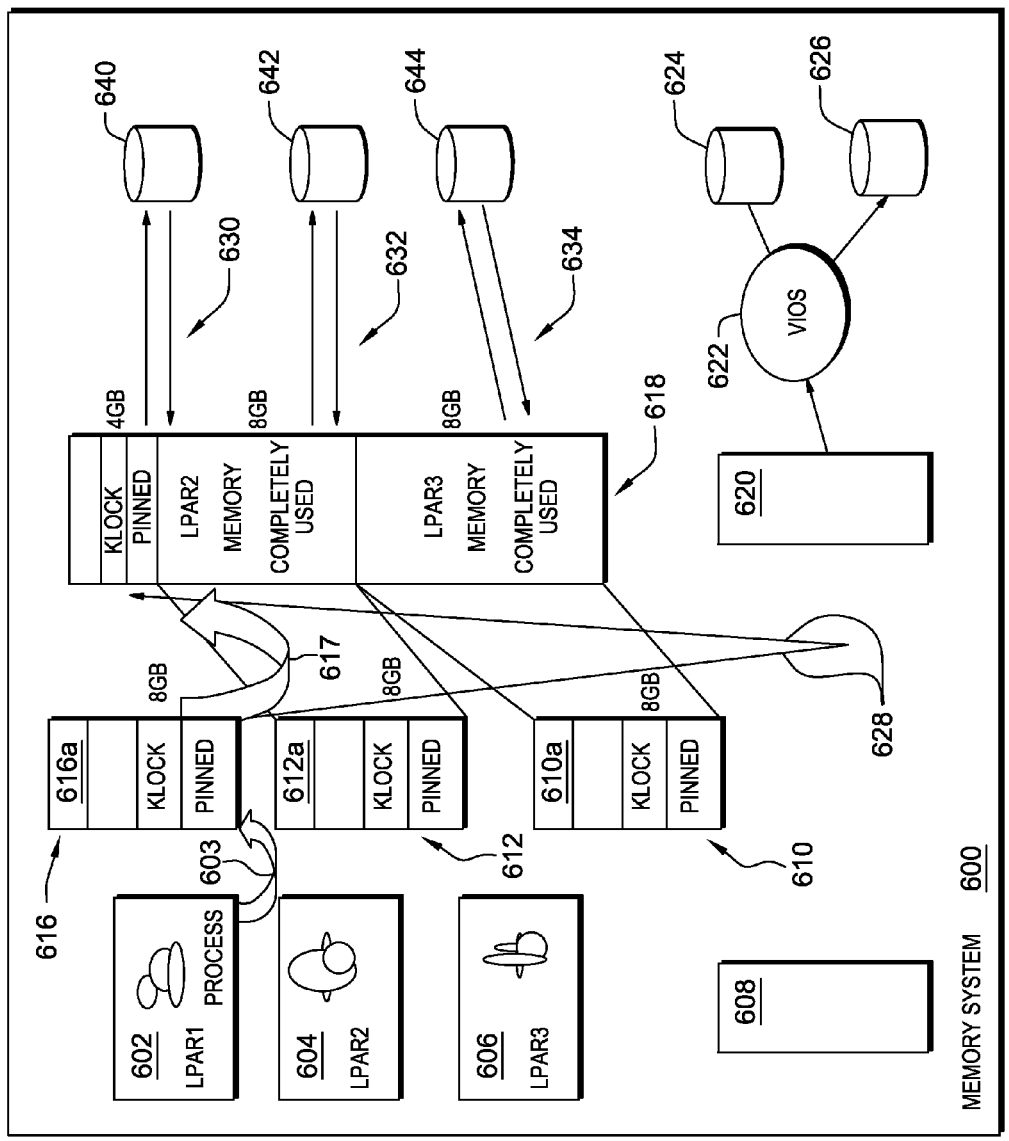
FIG. 2 is a schematic view of a second embodiment of a computer memory system suitable for use with embodiments of the present disclosure.

FIG. 2 shows memory system 600, including: LPAR1 602; kernel memory pinning path 603; LPAR2 604; LPAR3 606; page table at operating system level 608; first logical memory 616 (including minimum free space 616a); second logical memory 612 (including minimum free space 612a); third logical memory 610 (including minimum free space 610a); hypervisor level memory pinning path 617; shared memory pool 618; reference lines 628 (indicating that hypervisor owns the page table); hypervisor level page table 620; VIOS 622; SCSI hard disk on VIOS 624; SAN disk on VIOS 626; lrud and memory access paths 630, 632 and 634; and local disks 640, 642 and 644. In system 600, there is no loaning of pages because LPAR1 memory and LPAR2 memory are completely used. As will be discussed below, some embodiments of the present disclosure focus mainly on the operation of SCSI hard disk on VIOS 624 and SAN disk on VIOS 626.

Figure 3:
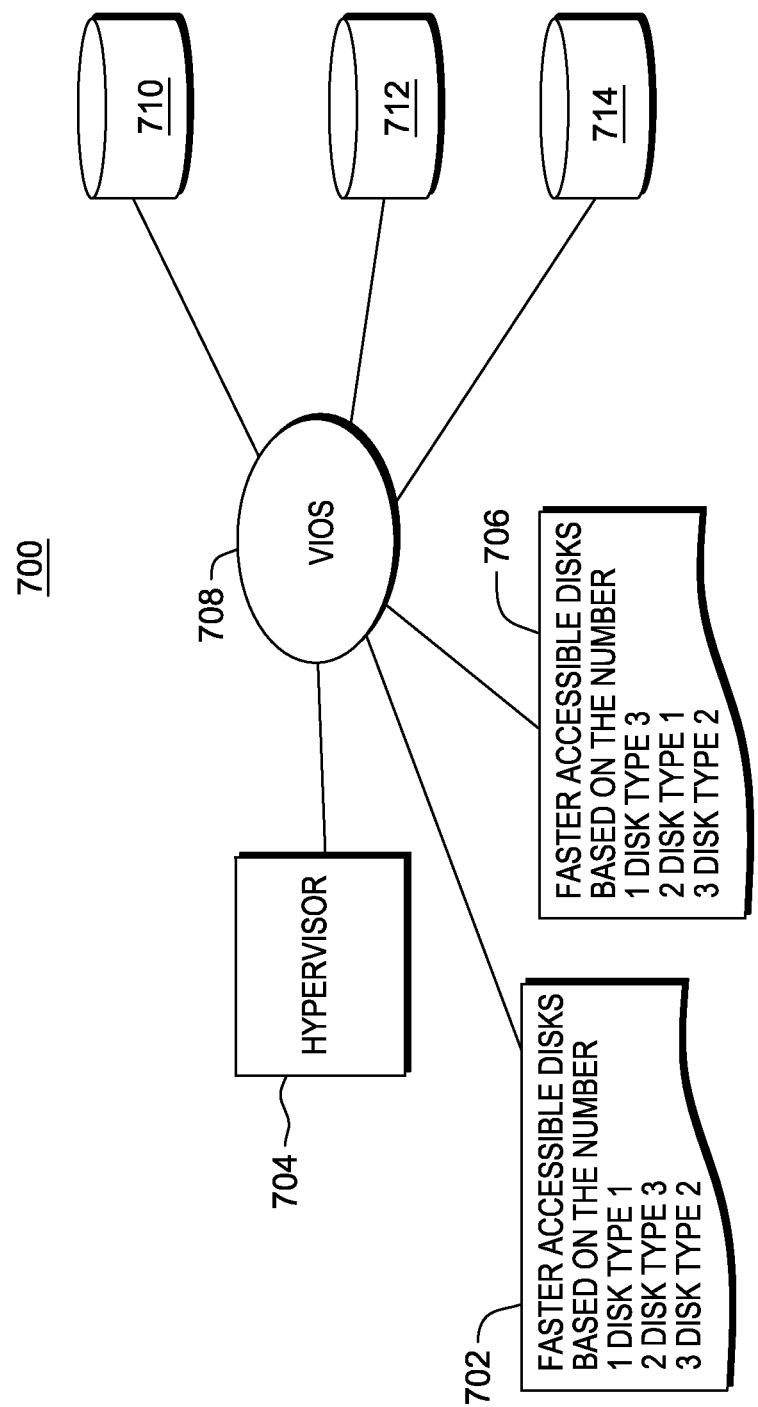
FIG. 3 is a schematic view of a third embodiment of a computer memory system suitable for use with embodiments of the present disclosure.

FIG. 3 shows a block diagram of system 700, including: first block 702; hypervisor 704; second block 706; VIOS 708; SCSI disk 710; SAN disk 712; SATA disk 714. In system 700: (i) between SCSI disk 710 and VIOS 708, a page is read in 0.5 seconds; (ii) between SAN disk 712 and VIOS 708, a page is read in 0.8 seconds; and (iii) between SATA disk 714 and VIOS 708, a page is read in 0.7 seconds. First block 702 represents hypervisor accessible common memory (at time instant t2). Second block 706 represents hypervisor accessible common memory (at time instant t1).

Hypervisor accessible common memory 702, 706 has an ordered list of storage media in the order of accessibility (based on the speed) at a given instance of time (herein referred to as an "order of accessibility list"). In system 700, the order of accessibility list of block 706 reveals that, at time t1, the fastest accessible storage media disk type 3 (which is SCSI disk 710). For this reason, at time t1, SCSI disk 710 is the disk that is the most desirable storage media for providing storage space for klock pages.

The hypervisor figures out which disk has the fastest accessibility using heuristic algorithms. Two approaches, A and B, for such an algorithm will be discussed respectively in the following two paragraphs.

Approach A is based on the following Table 1:

| Disk | T1 | T2 | T3 | T4 | Average Speed (for approach 2) |
|---|---|---|---|---|---|
| SAS | 0.40 | 0.4 | 1.0 | 0.3 | 2.1/4 |
| SAN | 0.45 | 0.5 | 0.55 | 0.4 | 1.9/4 |
| Virtual SCSI | 0.44 | 0.6 | 0.7 | 0.5 | 2.24/4 |
| SCSI | 0.46 | 0.44 | 0.3 | 0.5 | 1.7/4 |

In Table 1, it can be seen the time taken to access a disk at different instants of time T1, T2, T3, T4. The time interval is algorithm dependent. This time interval will usually be set to be very small. For the sake of the simplicity of this example, the sample space is restricted to four disks, with each disk having a different disk type. Alternatively, there may be more than one disk of each type, and all the disks attached to the controller may be included in the table. The disks of Table 1 are all suitable candidates for the write operation that is going to happen. As can be seen from Table 1, the SAS type disk almost always exhibits the fastest disk access time. Therefore, in this approach, the hypervisor will advise that the SAS type disk is the preferred disk to write upon.

In Approach B, Table 1 is used, specifically the column showing average (that is, arithmetic mean) time taken for disk access considering all four instants T1, T2, T3, T4. Under Approach B, the preferred disk type is the SCSI disk.

Under both Approach A and Approach B, the preferred disk is chosen based upon disk speed. This disclosure will not attempt to exhaustively list every approach for determining a preferred disk, based on disk speed, but it should be understood that various embodiments of the present disclosure use different approaches for determining which disk is likely to be the fastest (and therefore used for storing klock pages). Also, while the embodiments discussed above relate to klock pages, other embodiments apply to the storage of other critical/important pages. Some examples of pages that are typically considered to be "high importance pages" are: pages that belong to device driver handling routines, kernel extension pages, real time OS pages, pages used by the Heartbeat daemon, etc. "High importance pages," as used in this document, is hereby defined to collectively mean klock pages, critical pages and/or important pages.

In some embodiments of the present disclosure, a software daemon, running in the Virtual I/O Server (VIOS), updates the "order of accessibility list" with the latest desirable order of accessing the disks. In some of these embodiments, the order is updated based on the speed with which that media can be accessed. The speed might differ based on bottlenecks, hardware degradation, etc. Therefore, high performance pages are preferably placed on the most desirable storage media when AMS is the operative mode.

In some embodiments, vio clients of the software provide hints to the hypervisor as to which pages are to be considered as high importance pages. Using these hints and the order of accessibility list, a high importance page is stored in the media type and/or device that is characterized by the fastest accessibility at the time of "stealing" the high importance page. Although the foregoing embodiments have been explained primarily in terms of disk storage media, it should be understood that the media types and/or devices may include types of non-volatile storage media which are not disk based (now known or to be developed in the future).

FIG. 4 shows system 800 including: software page frame table 802; hypervisor 804; VIOS 806; first disk 808; second disk 810; VIOS-hypervisor shared block 812; and data communication paths 814, 816 and 818. As mentioned above, a hint is communicated from software page frame table 802 to hypervisor 804. If the hinted-at page is determined to be a high importance page, by hypervisor 804, then the hypervisor will use this information to page out the klock page (if necessary) on communication path 814. The page out to VIOS paging space is performed through communication path 816. VIOS obtains the information of the order of relative desirability of the two disks 808, 810 based on the fastest-disk-determination algorithm used by the embodiment's software daemon.

In some embodiments, a potential advantage is that storage space in degrading hardware tends not to be used to store high importance pages. For this reason, the operation of a critical workload using these high importance pages is not impacted due to hardware failure in the VIOS AMS storage media (for example, disks).

In the above explanation for the sake of simplicity we have assumed that, all kinds of disks will be attached to a given VIOS. But in some embodiments there may only be two types of disks, with one type attached to one VIOS and the other type attached to the other VIOS. In these embodiments, the hypervisor will inform each VIOS of the preferred disk by considering only the disk types available to that VIOS. This also complies with the design principle of "need to know".

Some embodiments of the present disclosure extend the fastest-disk-based-decision-making ideas to operations of reading from a storage media (for example, a disk). To apply this idea when we read from "memory" (that is AMS storage which is used in the traditional manner of volatile memory), it is assumed that the environment is a mirrored environment and that one mirror exists on each kind of storage media available to the VIOS. If that is the case, the same logic as explained above can be applied to retrieve high importance pages from the type of storage media that is likely to give the fastest read at any given time. But mirroring is an expensive operation and especially when we are dealing with devices that use paging ("paging devices"). So, a special type of mirroring may be useful, where only klock pages are mirrored from the paging devices that reside on the VIOS. This "selective mirroring" is implemented according to Table 2 as follows:

| Disk | Disk block descriptor | Target disks-dblock desc for mirroring |
|---|---|---|
| Disk1 | 1111 | Disk4 1320 |
| Disk1 | 1112 | Disk4 1503 |
| Disk2 | 1110 | Disk3 1120 |
| Disk2 | 1104 | Disk3 1150 |
| Disk3 | 1120 | Disk2 1110 |
| Disk3 | 1150 | Disk2 1104 |
| Disk4 | 1320 | Disk1 1111 |
| Disk4 | 1503 | Disk1 1112 |

Table 2 is maintained with disk block descriptors data for blocks that contain the klock pages. This is obtained when the klock pages are being written onto the disk. Selective mirroring will happen only for the block/(s) to which the klock pages are written, with the identities of these blocks being obtained from the above table. The last column of Table 2 shows the target disk/(s) to which mirroring should be applied.

When the klock pages no longer exist on the disk, then the entry for the disk block descriptor from Table 2 is removed as well. This is done by searching the hypervisor page table translation entry for the diskblock descriptor in Table 2. If the descriptor is no longer present in the hypervisor page table translation, then it is removed from Table 2. This holds good even if there is AMD (Advanced Memory Deduplication) enabled on the system as well. The "Selective Mirroring" might be expensive while the pages are being written into the disk. To address this potential issue, some embodiments of the present disclosure use background syncing of these mirrors in question. With the syncing in background, the paging operations will not be hampered. In this way, a mirror will not be available for read operations until it has been fully synched or mirrored. If a read request comes before the sync has finished for a particular mirror, then that mirror will not be considered among the disks from which to read the data. Basically, this disk will be left out from the calculations mentioned above, that the hypervisor does to get the fastest accessible disk.

Some definitions will be set forth in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Read-writing . . . data to, read-write: at least one of: reading data from or writing data to a volatile memory or a non-volatile storage medium.

What is claimed is:

1. A method for use with a set of non-volatile storage media and a virtual input/output system operating in a memory sharing environment, the method comprising:
   estimating which non-volatile storage medium, of the set of non-volatile storage media, will have the fastest access at a given time; and
   read-writing data by the virtual input/output system of a high importance page to the non-volatile storage media estimated to have the fastest access time; and
   wherein the read-writing of data by the virtual input/output system includes writing a klock page to the non-volatile storage media estimated to have the fastest access time.

2. The method of claim 1 wherein the estimation of the fastest non-volatile storage medium is performed by a hypervisor.

3. The method of claim 1 wherein:
   the estimation of which non-volatile storage medium, of the set of non-volatile storage media, will have the fastest access at a given time repeats intermittently so that estimation of the fastest storage medium is updated on an ongoing basis; and
   the read-writing of data by the virtual input/output system of high importance pages is to the non-volatile storage media most recently estimated to have the fastest access time.

4. The method of claim 3 wherein:
   the estimation of which non-volatile storage medium, of the set of non-volatile storage media, will have the fastest access at a given time includes at least one of the following algorithms:
      determination of the fastest mean access time with respect to historical access speed data for the set of non-volatile storage media,
      determination of the fastest median access time with respect to historical access speed data for the set of non-volatile storage media, and/or
      determination of the storage medium that is most frequently fastest with respect to historical access speed data for the set of non-volatile storage media.

5. The method of claim 1 further comprising:
   mirroring a first klock page on all storage media of the set of storage media.

* * * * *